(12) United States Patent
Jeong et al.

(10) Patent No.: US 10,778,637 B2
(45) Date of Patent: Sep. 15, 2020

(54) METHOD FOR NAMING DOMAIN NAME SYSTEM (DNS) FOR INTERNET OF THINGS (IOT) DEVICE

(71) Applicant: RESEARCH & BUSINESS FOUNDATION SUNGKYUNKWAN UNIVERSITY, Suwon-si (KR)

(72) Inventors: Jaehoon Jeong, Busan (KR); Se Jun Lee, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 250 days.

(21) Appl. No.: 15/745,665

(22) PCT Filed: Jul. 13, 2016

(86) PCT No.: PCT/KR2016/007586
§ 371 (c)(1),
(2) Date: Jun. 29, 2018

(87) PCT Pub. No.: WO2017/014482
PCT Pub. Date: Jan. 26, 2017

(65) Prior Publication Data
US 2018/0309712 A1    Oct. 25, 2018

(30) Foreign Application Priority Data
Jul. 17, 2015    (KR) .................. 10-2015-0101662

(51) Int. Cl.
G06F 15/16    (2006.01)
H04L 29/12    (2006.01)
H04L 29/08    (2006.01)

(52) U.S. Cl.
CPC .... H04L 61/1511 (2013.01); H04L 29/12066 (2013.01); H04L 29/12622 (2013.01);
(Continued)

(58) Field of Classification Search
CPC . H04L 61/1511; H04L 67/12; H04L 61/2092; H04L 61/3015; H04L 61/6059;
(Continued)

(56) References Cited

U.S. PATENT DOCUMENTS 8,458,118 B1 *   6/2013   Hale .................. H04L 41/0809
                                                          707/603
2003/0126241 A1 *   7/2003   Nagura ............. H04L 29/12009
                                                          709/221
(Continued)

FOREIGN PATENT DOCUMENTS

KR    10-2004-0056392 A    7/2004
KR    10-2004-0097849 A    11/2004
(Continued)

OTHER PUBLICATIONS

J. Jeong, et al., "DNS Name Autoconfiguration for Home Network Devices draft-jeong-homenet-device-name-autoconf-00," *IETF, Network Working Group*, Internet-Draft, Aug. 2014 (45 pages, in English).

(Continued)

*Primary Examiner* — Liang Che A Wang
*Assistant Examiner* — Johnny B Aguiar
(74) *Attorney, Agent, or Firm* — NSIP Law

(57) ABSTRACT

A method for naming a Domain Name System (DNS) for an Internet of Things (IoT) device comprises the steps of: receiving a first message including a DNS search list by a device connected to a network on the basis of Internet Protocol Version 6 (IPv6) protocol; generating, by the device, a domain name including model information and an identifier of the device; performing, by the device, a redundancy check for the domain name on the basis of a neighbor discovery (ND) protocol; and, when the domain name is not redundant, registering the domain name and IPv6 address (Continued)

for the device into a DNS server on the basis of a node information (NI) protocol by a domain name-collecting apparatus connected to the network.

22 Claims, 11 Drawing Sheets

(52) U.S. Cl.
CPC .... *H04L 29/12641* (2013.01); *H04L 61/3025* (2013.01); *H04L 67/12* (2013.01); *H04L 29/12226* (2013.01); *H04L 29/12603* (2013.01); *H04L 61/2015* (2013.01); *H04L 61/2092* (2013.01); *H04L 61/3005* (2013.01); *H04L 61/3015* (2013.01); *H04L 61/6059* (2013.01); *H04L 67/18* (2013.01)

(58) Field of Classification Search
CPC .............. H04L 67/18; H04L 29/12066; H04L 29/12603; H04L 29/1232; H04L 29/12622; H04L 29/12641; H04L 29/12226; H04L 61/2015; H04L 61/2076; H04L 61/3025; H04L 61/3005; H04L 61/30
USPC ................ 709/220, 221, 222, 223, 224, 245
See application file for complete search history.

(56) References Cited

U.S. PATENT DOCUMENTS

| | | | | |
|---|---|---|---|---|
| 2004/0083306 | A1* | 4/2004 | Gloe | H04L 29/12066 709/245 |
| 2004/0148398 | A1* | 7/2004 | Park | H04L 29/12264 709/227 |
| 2004/0230446 | A1* | 11/2004 | Park | G06Q 10/02 709/245 |
| 2009/0274062 | A1* | 11/2009 | Yan | H04L 29/12066 370/254 |
| 2012/0089713 | A1* | 4/2012 | Carriere | H04L 12/4641 709/222 |
| 2012/0314624 | A1* | 12/2012 | Asati | H04L 61/1511 370/257 |
| 2015/0067163 | A1* | 3/2015 | Bahnsen | H04W 64/003 709/225 |
| 2016/0212223 | A1* | 7/2016 | Yang | H04L 61/2015 |

FOREIGN PATENT DOCUMENTS

| | | |
|---|---|---|
| KR | 10-2010-0074066 A | 7/2010 |
| KR | 10-2013-0117436 A | 10/2013 |

OTHER PUBLICATIONS

J. Jeong, et al., "DNS Name Autoconfiguration for Home Network Devices draft-jeong-homenet-device-name-autoconf-01," *Proceedings of the IETF Conference*, Nov. 2014 (11 pages, in English).

S. Lee, et al., "DNS Name Autoconfiguration for IoT Home Devices," *Proceedings of the 29th International Conference on Advanced Information Networking and Applications Workshops*, Mar. 2015, pp. 131-134.

International Search Report dated Oct. 7, 2016, in corresponding International Application No. PCT/KR2016/007586 (3 pages in English, 3 pages in Korean).

* cited by examiner

METHOD FOR NAMING DOMAIN NAME SYSTEM (DNS) FOR INTERNET OF THINGS (IOT) DEVICE

CROSS-REFERENCE TO RELATED APPLICATIONS

This application is the U.S. National Stage filing under 35 U.S.C. 371 of International Application No. PCT/KR2016/007586, filed on Jul. 13, 2016, which claims the benefit under 35 USC 119(a) and 365(b) of Korean Patent Application No. 10-2015-0101662, filed on Jul. 17, 2015, in the Korean Intellectual Property Office.

TECHNICAL FIELD

The present invention relates to an automatic Domain Name System (DNS) naming method based on Internet Protocol Version 6 (IPv6).

BACKGROUND ART

Internet of Things (IoT) is the most notable Internet-related technology in recent years. The service using IoT may basically provide a certain service through a very large number of devices connected to the Internet.

Devices connected to the Internet need to have individual Internet Protocol (IP) addresses. In the IoT environment, typical Internet Protocol Version 4 (IPv4) has a limitation of Internet address depletion. As a technology for overcoming this limitation, IPv6 has emerged. The Internet Engineering Task Force (IETF) has established standards related to IPv6.

On the other hand, DNS manages IP addresses and domain names for objects connected to the Internet. In a typical Internet environment, the domain name is manually set by a user.

DISCLOSURE

Technical Problem

Many IoT devices are used in an IoT environment. Accordingly, setting the domain name for each IoT device one by one is very cumbersome. Like the multicast Domain Name System (mDNS), there is a technology for automatically assigning a domain name. For example, there is a protocol like Bonjour developed by APPLE. However, mDNS basically generates much traffic on a network based on multicast, and can respond to a naming request message only when a device connected to the Internet is always running (awake).

In the following description, a technology in which an IoT device automatically generates a DNS name while transmitting a DNS Search List (DNSSL) option containing domain information in multicast based on a Neighbor Discovery (ND) of IPv6 is provided.

Technical Solution

In one aspect, a method for naming DNS for an IoT device includes: receiving, by a device connected to a network according to an IPv6 protocol, a first message including a DNS search list; generating, by the device, a domain name including model information and an identifier of the device; performing, by the device, a duplicate check on the domain name according to a Neighbor Discovery (ND) protocol; and registering, by a domain name collecting device connected to the network, the domain name and an IPv6 address for the device in a DNS server according to a protocol of a Node Information (NI) when the domain name is not duplicated.

In another aspect, a method for naming DNS for an IoT device includes: transmitting, by a router connected to a network according to an IPv6 protocol, a DNS search list to an IoT device through a Router Advertisement (RA) option or a Dynamic Host Configuration Protocol (DHCP) option; generating, by the IoT device, a domain name including model information of the IoT device, an identifier, and a domain suffix included in the DNS search list; and registering, by a domain name collecting device managing the IoT device, the domain name and an IPv6 address for the device in a DNS server according to a Node Information (NI) protocol.

Advantageous Effects

The technology described below transmits a message in unicast in a process of generating a DNS name, thereby reducing traffic. Also, in the technology described below, since a client device refers to name information about an IoT device through a DNS server, the domain name about the corresponding IoT device can be confirmed even when the IoT device is in sleep mode. Furthermore, in the technology described below, since the domain name includes the model information and/or the location information of the device, information about a specific device can be provided by only the domain name.

MODE FOR INVENTION

Figure 1:
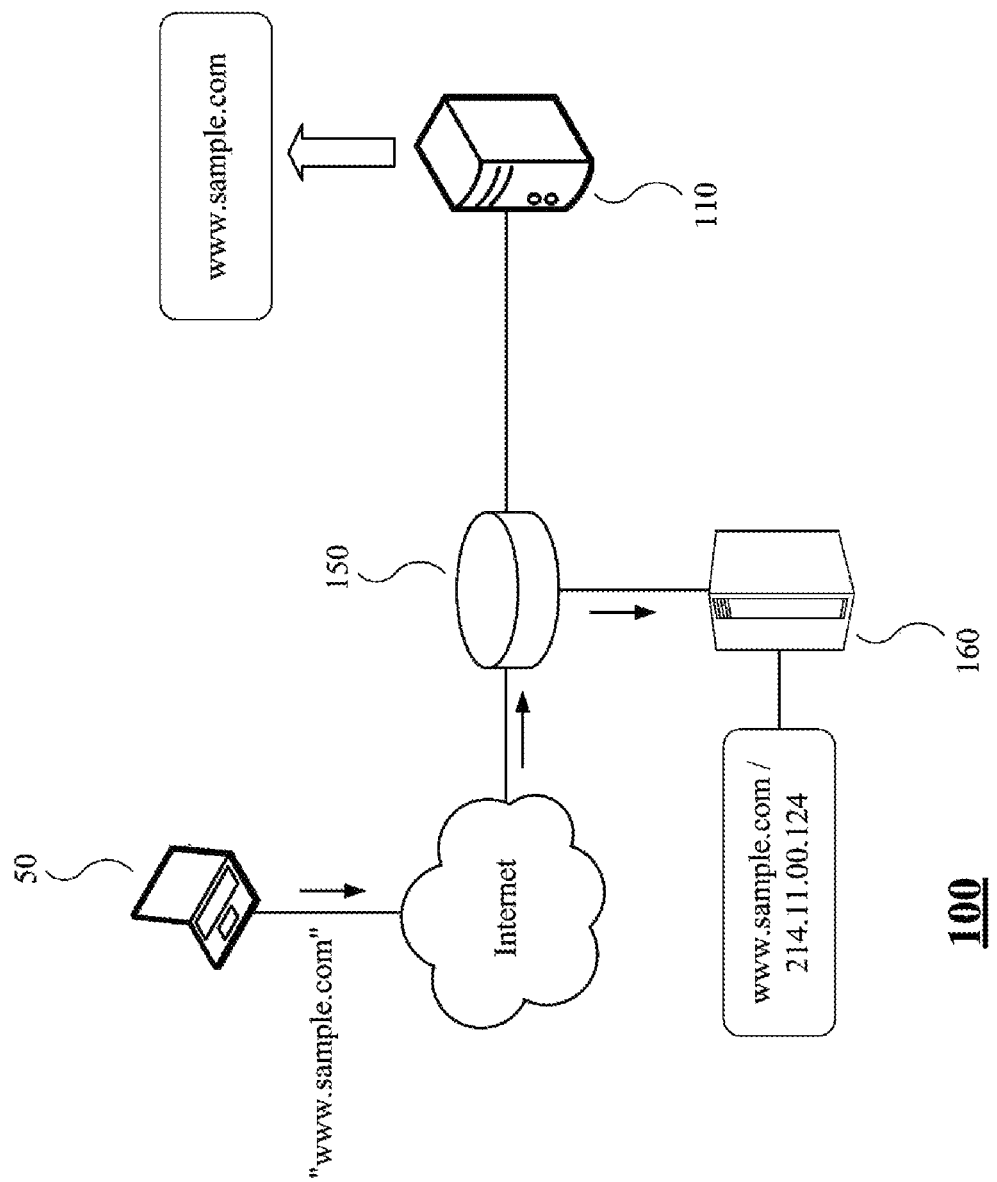
FIG. 1 is a view illustrating a configuration of a typical DNS.

Since the present invention can be modified into various types and can be implemented into various embodiments, specific embodiments will be illustrated in the drawings and described in this disclosure in detail. However, the present invention is not limited to a specific implementation type, but should be construed as including all modifications, equivalents, and substitutes involved in the spirit and the technical scope of the present invention.

The terms such as "a first/the first", "a second/the second", and "A or B" may be used to describe various components, but the components should not be limited by the terms. The terms are used only in order to distinguish one component from another component. For example, a first component may be named a second component without deviating from the scope of the present invention, and similarly, the second component may be named the first component. The term "and/or" includes a combination of a plurality of related items or any one of a plurality of related items.

The terms used herein are used only to describe specific embodiments, and are not intended to limit the present invention. The singular forms "a," "an," and "the" include plural referents unless the context clearly dictates otherwise. In this disclosure, the terms "include," "comprise," or "have" specify features, numbers, steps, operations, elements or combinations thereof, but do not exclude existence or addition possibility of one or more other features, numbers, steps, operations, elements or combinations thereof.

Prior to describing the drawings in detail, it is to be clarified that constituent parts in this specification is merely divided by main functions of each constituent part. That is, two or more constituent parts described below may be combined into one constituent part, or one constituent part may be divided into two or more constituent parts according to functions that are further subdivided. In addition, each of the constituent parts described below may additionally perform some or all of the functions of other constituent parts in addition to its own main functions, and some of the main functions which each constituent part takes charge of may be fully carried out by another constituent part.

Also, in carrying out methods or operation methods, each process for performing the methods may be performed differently from a described order unless a specified order is clearly described in the context. That is, each process may occur in the same order as described, may be performed at the substantially same time, or may be performed in a reverse order.

The technology described below relates to a technology for automatically generating and managing a DNS name. The technology described below uses an IP address based on IPv6. The technology described below uses a protocol defined in the IPv6 standard in a process of generating and registering a DNS name. Since the protocol defined in the IPv6 standard has already been revealed, a detailed description of the DNS registration process will be omitted.

FIG. 1 is a view illustrating a configuration of a typical DNS 100. In a typical Domain Name System (DNS), a DNS server 160 corresponds to a core component. In FIG. 1, a service server 110 providing a service called "www.sample.com" is shown as an example. A service provider needs to register a domain name (DNS name) for the service server 110 in order to provide a specific service to other users via the Internet using the service server 110. The service provider accesses the DNS server 160 through a computer device 50, and registers the domain name for its own service server 110. The DNS server 160, as well known, stores and manages the domain name and an actual IP address indicated by the domain name. In FIG. 1, the DNS server 160 stores the domain name (www.sample.com) for the service server 110 and the IP address (214.11.00.124) for the service server 110. FIG. 1 shows an example using IPv4. A router 150 is a component for controlling data delivery to the DNS server 160 and the service server 110.

It is assumed that a user for receiving a service attempts to access a service server with a domain name using a client device. The connection command delivered by the client device is used to find the IP address corresponding to the domain name in the DNS server 160, and the client device is connected to the service server 110 having the corresponding IP address.

In the typical DNS 100, the DNS server 160 stores and manages the domain name of the service server 110. However, in an IoT environment, it may be difficult for a service provider to set the domain names for a number of IoT devices one by one.

In a technology described below, when an IoT device (e.g., a sensor, a home appliance, a traffic light, a vehicle, etc.) participates in an IPv6 network, a DNS name is generated based on its own device information. The unique DNS name generated as above is registered into the DNS server for the IoT device. That is, the DNS automatically generates and registers DNS names for IoT devices without administrator or user intervention. Thereafter, client devices (PC, smartphone, tablet PC, etc.) used by a user may acquire the domain name for the IoT device through the DNS server, and may access the IoT device. Unlike a typical DNS, the technology described below is referred to as DNS Name Autoconfiguration (DNSNA) in the sense of automatically setting a domain name.

The DNSNA registers and manages the unique name of the IoT device using the DNS server to manage the IoT device. When an IoT device enters an IPv6 network, the IoT device generates a unique DNS name on a current IPv6 network based on its own device information. The DNS server registers the generated DNS name.

Figure 2:
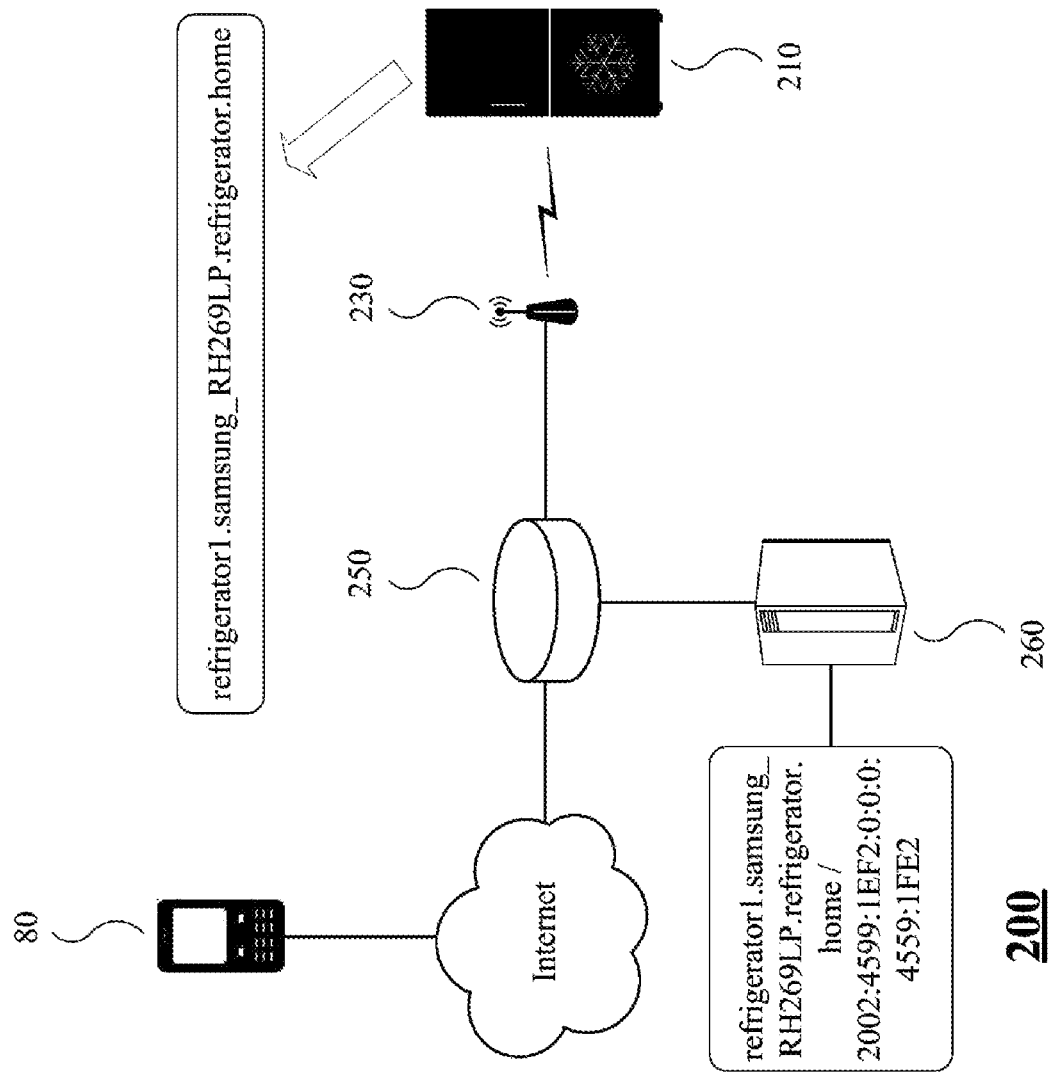
FIG. 2 is a view illustrating a configuration of a DNSNA.

FIG. 2 is a view illustrating a configuration of a DNSNA 200. FIG. 2 shows an example of a refrigerator used at home as an IoT device 210. Since the IoT device generally performs wireless communication, FIG. 2 shows a form in which the IoT device 210 is connected to a network through an Access Point (AP) 230 in the home. A router 250 controls data packets transmitted to a DNS server 260 and the IoT device 210 as shown in FIG. 1.

When the IoT device 210 first accesses the network or when there is a certain request, the IoT device 210 directly generates a DNS name. In FIG. 2, the IoT device 210 generates a DNS name "refrigerator1.samsung_RH269LP.refrigerator.home". The process of generating the DNS name by the IoT device and the meaning of the DNS name will be described later. The DNS name generated by the IoT device 210 is stored in the DNS server 260. The DNS server 260 stores a DNS name delivered by the IoT device 210 and an IP address indicated by the corresponding DNS name. In FIG. 2, the IP address is an address according to IPv6. As shown in FIG. 2, an IP address according to IPv6 has total eight segments separated by colons, and each segment is represented in 16 bits. IPv6 uses 128 bits to represent the IP address.

The client device 80 may acquire the DNS name for the IoT device 210 from the DNS server 260, and access the IoT device 210. Then, a user may check the status of a refrigerator through the client device 80 or control the refrigerator.

Figure 3:
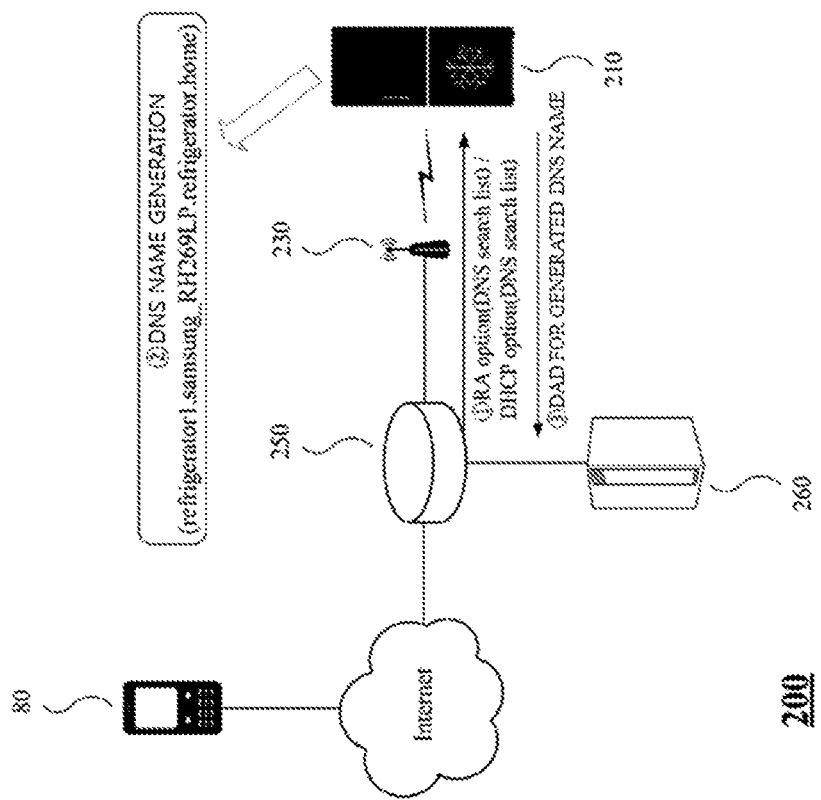
FIG. 3 is a view illustrating a process in which an IoT device generates a domain name in a DNSNA.

FIG. 3 is a view illustrating a process in which an IoT device generates a domain name in the DNSNA 200.

The IoT device 210 receives a DNS Search List (DNSSL) option through the router 250 (⌞). The DNSSL is a list of DNS domain suffixes which the IoT device uses in the process of registering domain names. The DNSSL may include a plurality of DNS suffixes. The DNSSL option is delivered through a Dynamic Host Configuration Protocol (DHCP) option or a Router Advertisement (RA) option according to the IPv6 standard. The RA option according to the IPv6 standard delivers the DNSSL information to the IPv6 host (IoT device). The DHCP option also delivers the DNSSL information to the IPv6 host (IoT device).

The IoT device 210, which is an IPv6 host, may check whether or not the received DNSSL option is valid. If the DNSSL option is valid, the IoT device 210 generates its own DNS name (|). The IoT device 210 has model information such as a model name assigned in the production process. The IoT device 210 may generate a DNS name using the model information. The IoT device 210 may be automatically configured by combining the device information (e.g., device category, vendor name, and model name) of the IoT device 210 with the DNS domain suffixes. Furthermore, the IoT device 210 may combine the unique identifier (unique_id) with the device information for the DNS name. In FIG. 3, "refrigerator1" of the DNS name is a unique identifier for distinguishing devices of the same model. "samsung_RH269LP" of the DNS name is a model name that contains the manufacturer name. "refrigerator" of the DNS name is a model category. "home" of the DNS name corresponds to the DNS domain suffix.

The IoT device 210 may check whether or not the generated DNS name is a unique DNS name in a domain name (subnet). The IoT device 210 may perform a duplicate check on the domain names according to a Neighbor Discovery (ND) protocol (└). The IoT device 210 may perform Duplicate Address Detection (DAD) with an IPv6 multicast address.

The IPv6 multicast address of the DNS name uses the link-local multicast address prefix ff02 ::/16 for the upper 64 bits corresponding to the network prefix, and takes the upper 64 bits including the Most Significant Bit (MSB) among 128 bits that is a hashing value with respect to the DNS name for the lower 64 bits corresponding to the network interface ID. The IoT device 210 performs a DAD process using the hashing value corresponding to the DNS name according to a Neighbor Discovery (ND) protocol.

When the domain name is duplicated, the IoT device 210 generates a new domain name in which the unique identifier of the device is changed to a new identifier, and performs a duplicate check on the new domain name. The domain name generation process is finished only when the IoT device 210 confirms that an un-duplicated domain name is generated in the domain name.

If there are a plurality of DNS domain suffixes in the DNSSL, the IoT device 210 repeats the domain name generation process for each DNS domain suffix.

Figure 4:
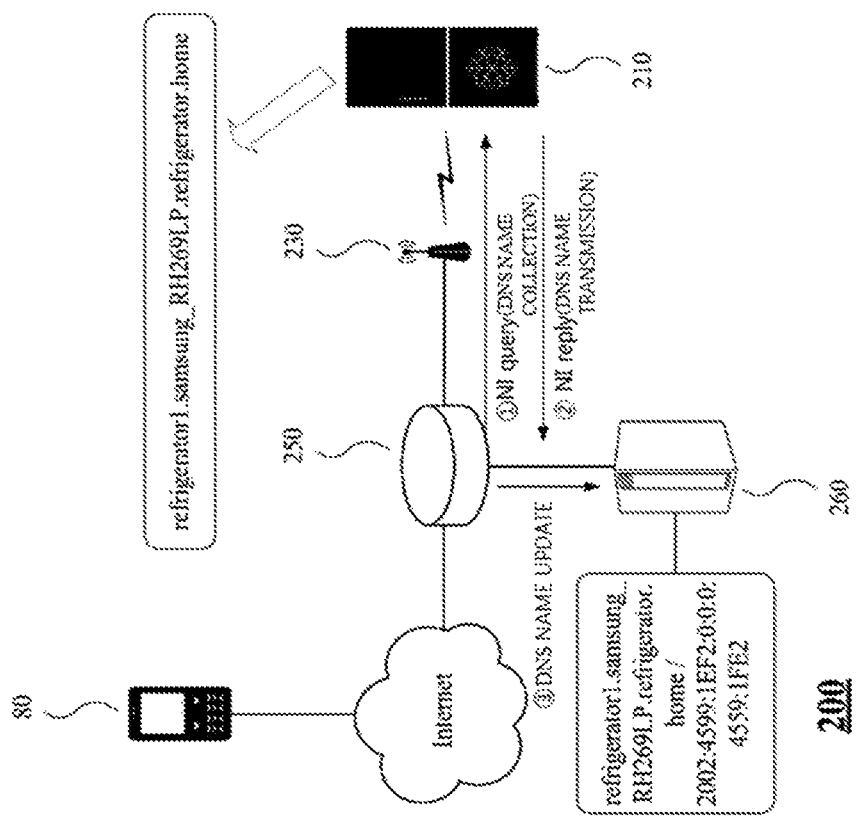
FIG. 4 is a view illustrating a process of registering a domain name for an IoT device in a DNSNA.

FIG. 4 is a view illustrating a process of registering a domain name for an IoT device in the DNSNA 200. It is assumed that the DNS name generated by the IoT device 210 is not duplicated.

A domain name collecting device connected to a network queries the IoT device 210 about a domain name, and stores the domain name of the IoT device 210 received in response in the DNS server 260. The domain name collecting device controls the process for registering the domain name of the IoT device 210 during the network configuration. In general, the domain name collecting device may be a device that manages the domain name of the IoT device 210. In FIG. 4, the router 250 collects the domain name for the IoT device 210.

The router 250 first requests a DNS name from the IoT device 210. The router 250 queries the IoT device 210 about the DNS name using a Node Information (NI) protocol (NI query, └). This process requires a new NI query in a typical NI protocol. That is, a new code for the NI type needs to be defined. The IoT device 210 delivers the DNS name of the IoT device 210 in response to the NI query (NI reply, └).

On the other hand, the NI query may be delivered in multicast to the IoT devices which are in the same domain name. In this case, it is desirable that a plurality of IoT devices in the domain name perform NI reply at different times. Accordingly, each of the plurality of IoT devices may transmit the NI reply at a randomly delayed time.

The router 250 transmits the DNS name of the IoT device 210 received via the NI reply to the DNS server 260, and the DNS server 260 stores the DNS name of the IoT device 210 (└). In some cases, there may be an IoT device whose domain name already exists in the DNS server 260. As described later, since the domain name of the IoT device may include location information, the domain name may also be changed when the IoT device moves. Accordingly, in this case, the DNS server 260 updates the DNS name of the IoT device into a newly received DNS name. The router 250 collects an IP address of the IPv6 together with the domain name of the IoT device 210, and together stores the IP address in the DNS server 260.

Figure 5:
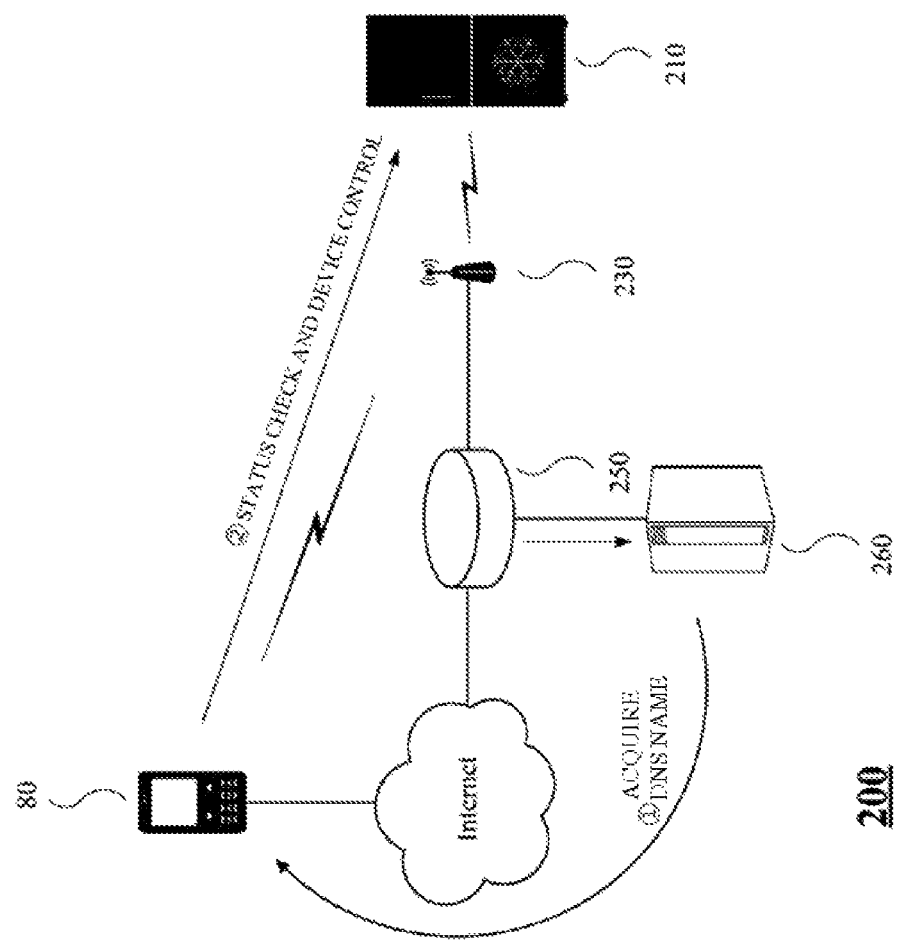
FIG. 5 is a view illustrating a process in which a client device controls an IoT device in a DNSNA.

FIG. 5 is a view illustrating a process in which a client device controls an IoT device in the DNSNA 200. It is assumed in FIG. 5 that the DNS name of the IoT device 210 is stored in the DNS server 260 like FIG. 4.

A user may check information about the IoT device 210 or control the IoT device 210 through a client device 80 such as a smartphone. The client device 80 accesses the DNS server 260 to acquire the DNS name of the IoT device 210 existing in the network (└). Although only one IoT device 210 is shown in FIG. 5, there may be a plurality of IoT devices in the network. In this case, the client device 80 may acquire DNS names for the plurality of IoT devices existing in the network from the DNS server 260. The client device 80 may access the IoT device 210 using the acquired DNS name. Then, the client device 80 may check the information of a refrigerator that is the IoT device 210, or may control the operation of the refrigerator.

The DNS name may include at least one of the model name of the IoT device, a model category indicating the type of the IoT device, different device identifiers for each IoT device having the same model name, and a network domain (domain suffix) of the IoT device. The DNS name is characterized by having information (model information) related to the model of the IoT device.

Figure 6:
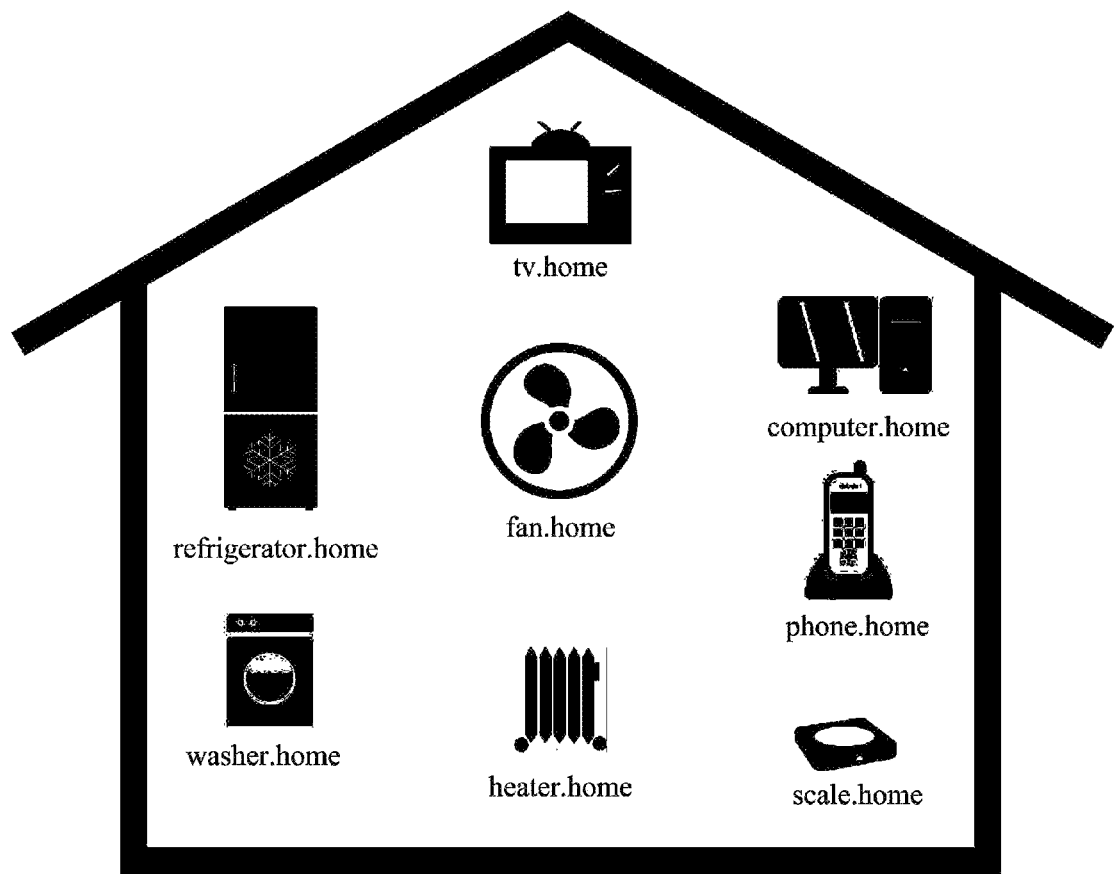
FIG. 6 is a view illustrating an exemplary DNS name for an IoT device used in the home.

FIG. 6 is a view illustrating an exemplary DNS name for an IoT device used in the home. In FIG. 6, the DNS name may include the domain name and the product type (category) of the IoT device. FIG. 6 shows an example in which the DNS name includes information corresponding to the model category among the model information of the IoT device. In FIG. 6, "home" is a domain suffix, and the information located in front of the domain suffix corresponds to the model category. In FIG. 6, the DNS names "tv.home" for a TV, "refrigerator.home" for a refrigerator, "washer.home" for a washing machine, "fan.home" for a ventilation fan, "heater.home" for a heater that is a heating apparatus, "computer.home" for a computer, "phone.home" for a telephone, and "scale.home" for a scale are used.

The DNS name may further include a model category. In this case, the DNS name may provide information about the IoT device. When a user accesses the DNS server through his/her smartphone and acquires the DNS name, as shown in FIG. 6, the smartphone may display what kind of IoT device exists in the home based on the DNS name according to a predefined regulation.

The DNS name may have a form shown in Table 1 below.

TABLE 1 unique_id.device_model.device_category.domain_name domain_name means the DNS suffix of the network domain of the IoT device. unique_id means a different unique identifier for the same model that exists in the same domain suffix. device_model refers to the model name provided by a manufacturer or vendor of the IoT device. The model name may include the name of the manufacturer that produces the product. device_category represents the model category of the IoT device. Naturally, the order of the elements that constitute the DNS name may be different from that of Table 1. The model name and model category correspond to information previously stored in the IoT device. The unique identifier is information generated by the IoT device in the process of generating the DNS name. The DNS suffix is information included in and delivered by the DNSSL.

For example, in FIG. 3, the IoT device 210 generates a DNS name called "refrigerator1.samsung_RH269LP.refrigerator.home". As already described, "refrigerator1" is a unique identifier for distinguishing devices of the same model, and "samsung_RH269LP" is a model name including a manufacturer name. In addition, "refrigerator" is a model category, and "home" is a DNS domain suffix.

On the other hand, when the number of IoT devices is large, it may be difficult to distinguish IoT devices only by the model information. In this case, the DNS name may further include the location information of the IoT device. The location information included in the DNS name may provide new information. An example of the DNS name including location information is shown in Table 2 below.

TABLE 2 unique_id.device_model.device_category.location of device.domam_name

The DNS name in Table 2 further includes location_of_device in addition to the DNS name in Table 1. location_of_device means the location information of the IoT device. The location information is assumed to be acquired in advance by the IoT device.

The location information may be collected in various ways as follows. (1) If the IoT device has a position tracking device such as a Global Positioning System (GPS) sensor, absolute coordinate information such as GPS coordinates may be used. When satellite signals like GPS coordinate information are used, an IoT device usually disposed outdoors may acquire coordinates. Alternatively, when there is a system that finds the location indoors using an indoor communication signal (e.g., WI-FI), the IoT device may also acquire indoor location information.

(2) When the IoT device is equipped with an acceleration sensor, a geomagnetic sensor, or the like, the IoT device may generate relative location information with respect to a point where the IoT device is moved and located based on a specific reference point. For example, an IoT device disposed in the home may know a location where the IoT device starts to move from a reference position such as a door and then is disposed, on the premise that the IoT device knows the structure of the house in advance.

(3) Assuming that there is another IoT device that already holds certain location information in a specific area, the IoT device may know that there is a specific IoT device at a communicable distance through wireless communication. Accordingly, the IoT device may approximately estimate the location of the IoT device by referring to the location information of the other device around the IoT device. In addition, if there are three or more devices having a plurality of location information at a communicable distance, the IoT device may relatively accurately know the location of the IoT device among the surrounding devices, using the intensity of the signals that are mutually exchanged.

(4) A separate device for acquiring location information for the IoT device may also be used. For example, a user may transmit location information of the IoT device to IoT devices disposed nearby using a device capable of finding the location outdoors or indoors.

Figure 7:
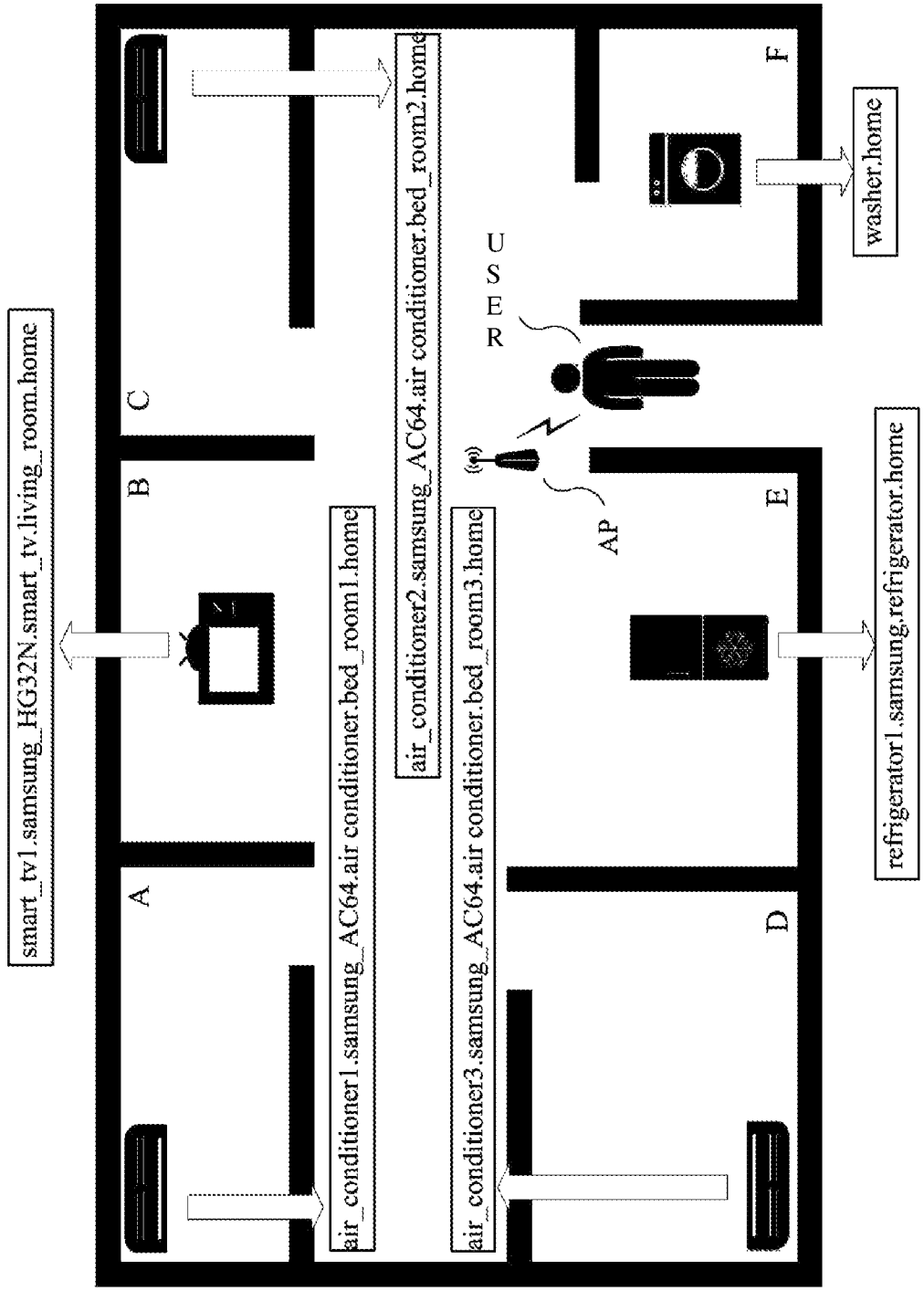
FIG. 7 is a view illustrating another exemplary DNS name for an IoT device used in the home.

FIG. 7 is a view illustrating another exemplary DNS name for an IoT device used in the home. FIG. 7 shows an example in which the IoT device used in the home generates the DNS name using the model information and the location information.

In FIG. 7, each area (living room, kitchen, bedroom, etc.) in the home are expressed as alphabets (A, B, C, D, E, and F). The DNS names of the IoT devices in each area are shown in Table 3 below.

TABLE 3

| Area | IoT Device | DNS Nave |
| --- | --- | --- |
| A | Air conditioner | air_conditioner1.samsung_AC64.air conditioner.bed_room1.home |
| B | Smart TV | smart_tv1.samsung_HG32N.smart_tv.living_room.home |
| C | Air conditioner | air_conditioner2.samsung_AC64.air conditioner.bed_room2.home |
| D | Air conditioner | air_conditioner3.samsung_AC64.air conditioner.bed_room3.home |
| E | Refrigerator | refrigerator1.samsung.refrigerator.home |
| F | Washer | washer.home |

The DNS name of the washing machine in the area denoted by F includes the model category and domain suffix. The DNS name of the refrigerator in the area denoted by E includes the unique identifier, model name shown only by manufacturer, model category, and domain suffix. The DNS name of the smart TV in the area denoted by B includes the unique identifier, model name, model category, location information (living room) and domain suffix.

The DNS names of the air conditioners in the bedrooms denoted by A, C and D each have the unique identifier, model name, model category, location information and domain suffix. The air conditioners in the bedrooms denoted by A, C and D have the same model name. Accordingly, the unique identifiers are air_conditioner1, air_conditioner2, and air_conditioner3, respectively, which are different from each other. Also, the location information of air conditioners is bed_room1, bed_room2 and bed_room3, respectively. When the IoT device is used in a relatively small area as shown in FIG. 7, it may be possible to distinguish the IoT devices from each other only by using the location information without using the unique identifier.

A user may check the status of the IoT device, and may also control each IoT device. In FIG. 7, a user may access an IoT device disposed in the home through the Internet using an AP in the home. Alternatively, a user may directly access an IoT device through local area network via an AP in the home.

Figure 8:
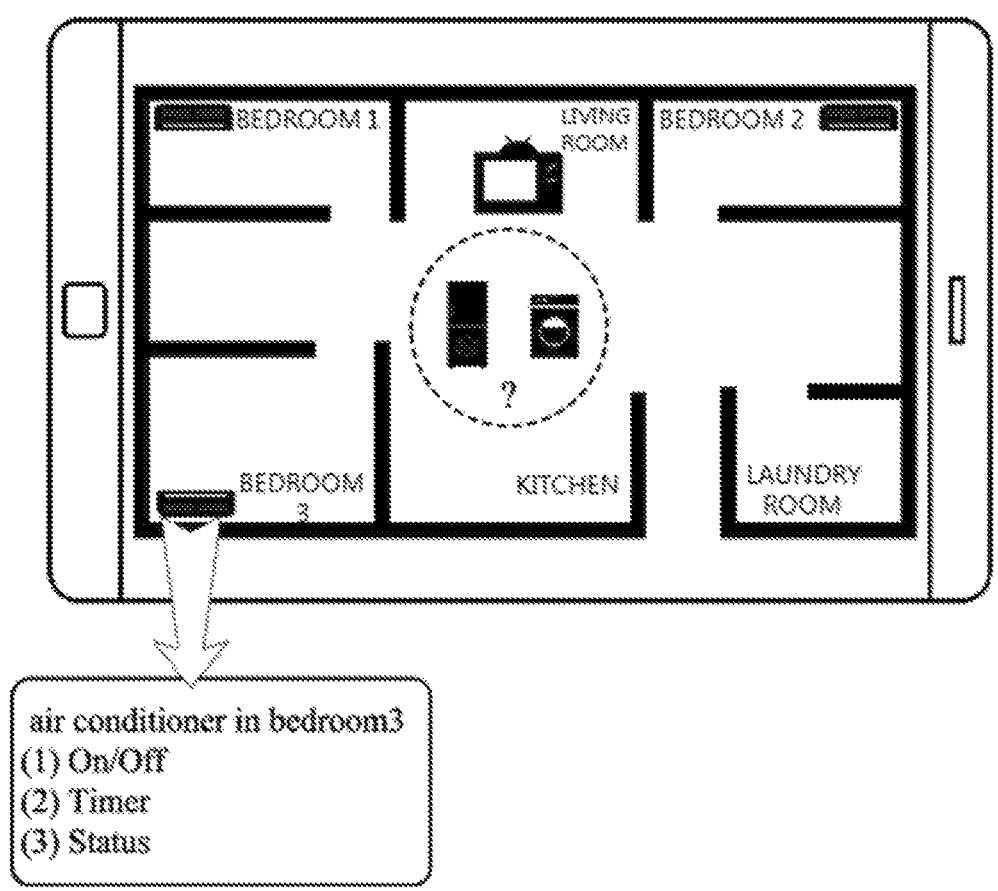
FIG. 8 is a view illustrating a smartphone displaying information about an IoT device located in the home.

FIG. 8 is a view illustrating a smartphone displaying information about an IoT device located in the home. FIG. 8 is a view illustrating a screen in which a user of FIG. 7 checks the IoT device disposed in the home through the smartphone. Smart TVs and air conditioners with location information in their DNS names are accurately marked with icons corresponding to each IoT device at their disposed locations. This is because the user's client device (smartphone) acquires the DNS name from the DNS server and extracts the location information of each IoT device from the DNS name. However, the refrigerator and washing machine, which do not have the location information in the DNS name, cannot know the accurate locations, and thus are displayed with a question mark (?) in the dotted line area of the center.

When a user selects the air conditioner in the bedroom 3, a menu as shown in the bottom of FIG. 8 may be displayed on the screen. The smartphone may output rough information about the selected IoT device (air conditioner) as shown in the bottom of FIG. 8, and may output a menu for controlling the air conditioner. Then, a user may control the air conditioner via the control menu. For example, (1) the power may be turned on/off (On/Off), (2) the operation time may be set (Timer), and (3) the status may also be checked.

Although not shown separately, the IoT device may be used in a huge space such as a shopping mall and a warehouse, as well as a home. For example, it is assumed that each article stored in the warehouse is equipped with a sensor device (IoT device) indicating its own information. In this case, when an administrator acquires the DNS name of each IoT device, the administrator can acquire the location information of the IoT device. In addition, assuming that a product placed in a store such as a shopping mall is attached with a sensor device (IoT device) indicating the information of the product, a shopping mall customer may easily know which floor and section his/her desired product is displayed in the shopping mall through his/her smartphone. This is because the DNS name includes the model information and location information. That is, although the model information and the location information are not managed in a server, when the client device acquires the DNS name from the DNS server of the IPv6, specific information may be provided to the user.

Figure 9:
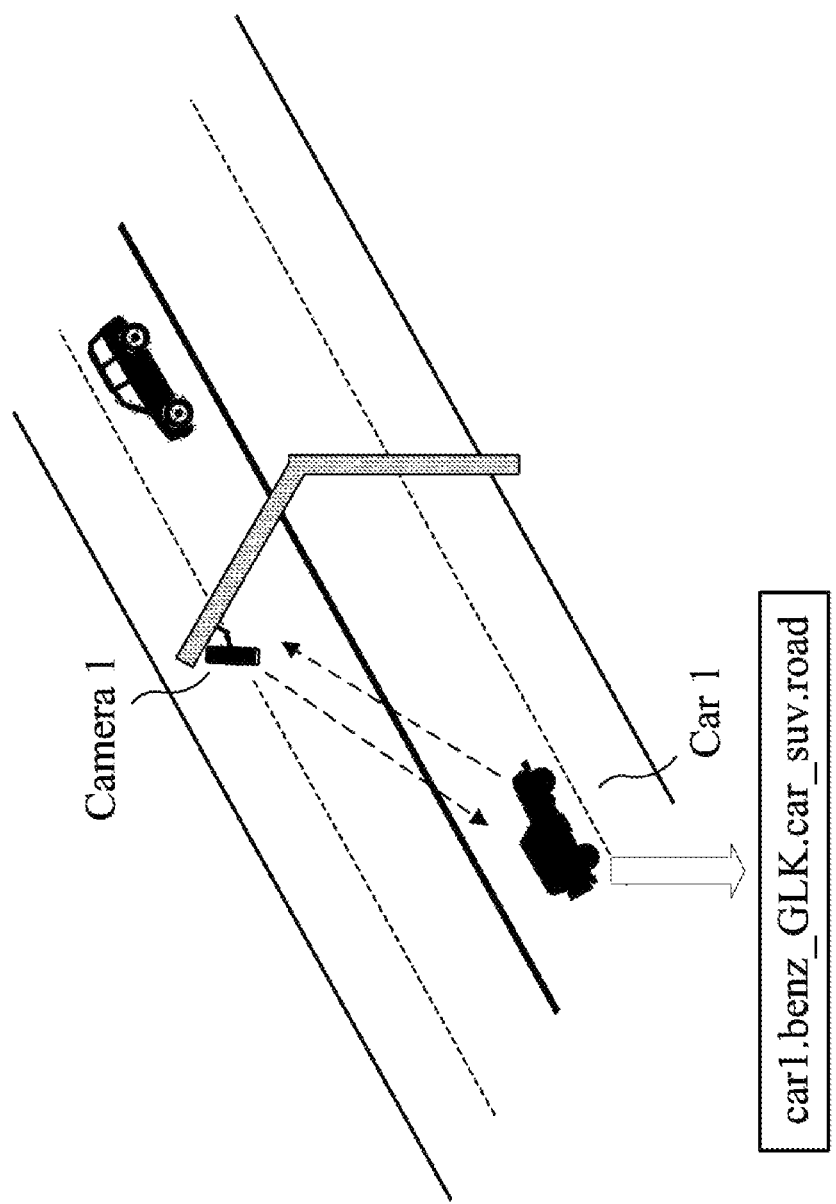
FIG. 9 is a view illustrating a DNS name for a vehicle traveling on a road.
Figure 10:
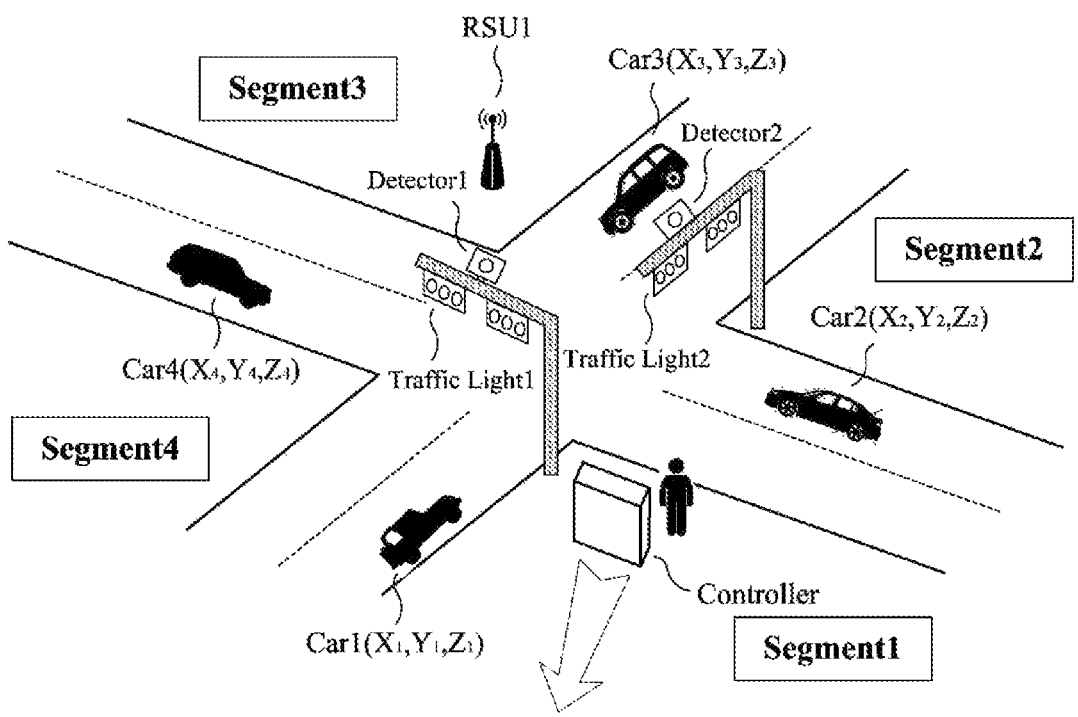
FIG. 10 is a view illustrating DNS names for vehicles and fixed devices at an intersection.

FIGS. 9 and 10 show an example of acquiring the information on vehicles and a traffic control device in a road. A traffic control surveillance center may use the information on vehicles for traffic management. Also, an intelligent vehicle system may use the information on vehicles for the autonomous driving of the vehicles.

FIG. 9 is a view illustrating a DNS name for a vehicle traveling on a road. FIG. 9 shows a vehicle (Car 1) traveling on the road and a speed camera (Camera 1). FIG. 9 is a view illustrating a process of generating a DNS name of an IoT device. Car 1 is equipped with a device corresponding to the IoT device. Camera 1 is equipped with a device that can communicate with vehicles. Camera 1 may also act as a router. Naturally, a speed camera usually may recognize a vehicle license plate to identify a vehicle, but may also use other information than image identification.

When Car 1 moves on the road, Camera 1 may measure the speed of Car 1, and simultaneously, may query Car 1 about the DNS name. Camera 1 delivers a DNSSL option to Car 1, and Car 1 creates its own DNS name.

The DNS name generated by Car 1 is "car1.benz_GLK.car_suv.road". Here, the DNS name includes a unique identifier (car1), a model name (benz_GLK), a model category (car_suv), and a domain suffix (road). If the DNS name generated by Car 1 is not duplicated, Camera 1 may immediately register the DNS name for Car 1 into the DNS server. Alternatively, as described above, Camera 1 may acquire the DNS name of Car 1 through NI query, and then may register the DNS name of Car 1 into the DNS server.

The client device may manage the vehicle using the DNS name of the vehicle stored in the DNS server, and may generate statistical information about a specific type of vehicle.

FIG. 10 is a view illustrating DNS names for vehicles and fixed devices at an intersection. In FIG. 10, vehicles moving at the intersection and traffic apparatuses arranged around the intersection all correspond to the IoT devices. In FIG. 10, it is assumed that the DNS names of the IoT devices existing at the intersection are already registered into the DNS server. In FIG. 10, the area divided by the intersection is represented by Segment 1, Segment 2, Segment 3 and Segment 4 in the counterclockwise direction from the lower end part.

RSU is an AP device installed on the road for vehicle communication (VANET), and Traffic Lights are traffic lights disposed at the intersection. Also, Detectors are sensor devices for acquiring information about moving vehicles. Controller is a device that represents and controls information about vehicles and traffic devices currently located at the intersection. It is assumed that the vehicles and the traffic devices disposed at the intersection are basically connected to a network through the AP.

In FIG. 10, four vehicles (Car 1, Car2, Car3 and Car4) are shown. In FIG. 10, the location information for each vehicle is represented by X, Y, and Z. The RSU may request the DNS name for the IoT device located at the intersection. On the other hand, the RSU itself corresponds to an IoT device. At the intersection, the Detector may request a DNS name from a moving vehicle. The DNS names for each IoT device shown in FIG. 10 are shown in Table 4 below.

TABLE 4

| IoT Device | DNS Name |
| --- | --- |
| RSU1 | rsu1.cisco__xz43.rsu.road__segment3.road |
| Traffic Light1 | traffic__light1.gov__TL32.traffic light.road__segment1.road |
| Traffic Light2 | traffic__light2.gov__TL32.traffic light.road__segment2.road |
| Detector1 | detector1.gov__LD51.loop__detector.road__segment1.road |
| Detector2 | detector2.gov__LD51.loop__detector.road__segment2.road |
| Car1 | car1.jeep__wrangler.car__suv.x1y1z1.road |
| Car2 | car2.audi__a435.car__sedan.x2y2z2.road |
| Car3 | car3.lexus__es300h.car__sedan.x3y3z3.road |
| Car4 | car4.bmw__x5.car__suv.x4y4z4.road |

The DNS names of the IoT devices in FIG. 10 all include unique identifiers, model names, model categories, location information, and domain suffixes. When explaining RSU1 as an example, rust is the unique identifier, cisco_xz43 is the model name, rsu is the model category, road_segment3 is the location information, and road is the domain suffix.

At the intersection, the Detector may recognize a moving vehicle, and may request the DNS name for the vehicle. In FIG. 10, the location information is also used in the DNS name of a vehicle. Accordingly, when a vehicle moves, the DNS name of the vehicle may be changed. It is assumed that the coordinate information of a vehicle measured through the GPS device is used as the location information of the vehicle. For example, Detector1 may send a DNSSL option to Car 1, and Car 1 may generate a DNS name including a current location (X1, Y1, Z1) and perform a duplicate check on the generated DNS name. Then, Detector1 or RUS1 may update the DNS name of Car 1 to the DNS server. Detector2 may also request to generate a DNS name for Car2.

It is assumed that a traffic apparatus fixedly arranged at an intersection knows its own location information while being arranged. Accordingly, the DNS name of the RSU 1 includes the location information referred to as road_segment 3, the Traffic Light 1 includes the location information referred to as the road_segment 1, and the Traffic Light 2 includes the location information referred to as the road_segment 2. Detector 1 includes location information referred to as road_segment 1, and Detector 2 includes location information referred to as road_segment 2.

An administrator may check the current status information of the intersection with the controller placed at the intersection or with his/her smartphone. In this case, the type and arrangement of each IoT device at the intersection may be displayed on the screen of the smartphone or the controller using the information included in the DNS names of each IoT device. The administrator may control the traffic lights (Traffic Light 1 and Traffic Light 2) of the intersection using the controller or smartphone. Since the administrator is provided with the location information of the traffic lights, the administrator may intuitively identify the traffic light (traffic light 1 or traffic light 2) that the administrator needs to control. In addition, since vehicles located at the intersection may also be identified by the controller or smartphone, the administrator may appropriately control the traffic lights, taking traffic flow into account.

On the other hand, the IoT device may uniformly move. For example, the IoT devices such as vehicles described in FIG. 10, sensor devices carried by users, smartphones carried by users, robots moving in buildings may move uniformly move. When the IoT device moves, the domain name itself to which the IoT device belongs may be changed. In this case, when the IoT device moves and reaches an area having a new domain name (domain suffix), a new DNS name may be generated.

When an IoT device receives an RA option including a new domain name as the IoT device moves, the IoT device may use DNS dynamic update (RFC 2136) to delete the old DNS name from the DNS server. For a specific IoT device, since at least one DNS name needs to exist in the DNA server, it is desirable that the IoT device does not delete the default DNS name in the home network of mobile IPv6.

In all of the above-mentioned processes, various methods for maintaining security may be used for message delivery. For example, the content related to the security issue of the NI protocol defined in RFC 4620 "Security Considerations" may be applied. For example, in order to prevent personal information leakage, the location-related information may be encrypted using a shared key or a public key. For example, the DNS name referred to as smartphone1.living_room.home may be encrypted like smartphone1.xxx.home. xxx is an encrypted string for living_room.

The DNS names described above include the model name or model category of the device. Instead of the model name, the DNS name may include other information for specifying the device. For example, the DNS name may include object_identifier instead of the model name or model category as shown in Table 5 below. ISO/IEC that is the International Organization for Standardization enacts ISO/IEC 9834-1: 2012 standard, and object_identifier is information proposed to be used to identify objects by oneM2M that is a de-facto group for object communication. The object_identifier includes an M2M node indication ID, a manufacturer ID, a model ID, and a serial number ID. The M2M node ID includes an identifier for a subject (e.g., country, organization, etc.) that manages the M2M node. The object_identifier includes a manufacturer identifier, a model identifier, and serial information about the product. Finally, the object_identifier also include the model information for the IoT device.

TABLE 5

| unique_id.object_identifier.domain_name |
| --- | unique_id means different unique identifiers for the same models that exist in the same domain suffix. domain_name means a DNS suffix of a network domain which the IoT device has. Naturally, the order of the elements constituting the DNS name may be different from that of in Table 1.

Furthermore, the DNS name may further include the location information of the IoT device in addition to the object_identifier as shown in Table 6 below.

TABLE 6

| unique_id.object_identifier.location of device.domain_name |
| --- |

The DNS name of Table 6 further includes location_of_device added to the DNS name of Table 5. location_of_device means the location information of the IoT device. The location information is assumed to be acquired in advance by the IoT device.

Figure 11:
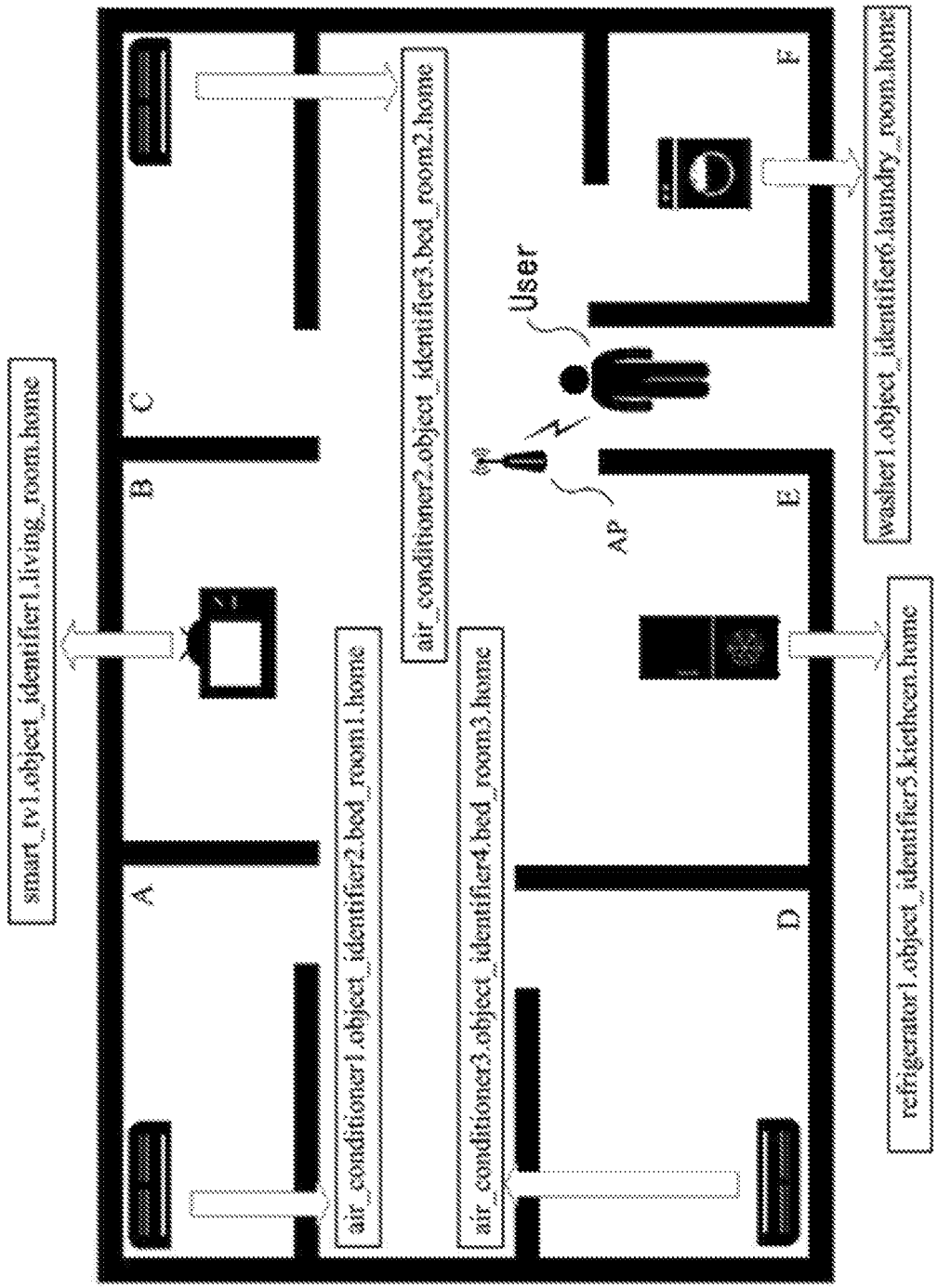
FIG. 11 is a view illustrating another exemplary DNS name for an IoT device used in the home.

FIG. 11 is a view illustrating another exemplary DNS name for an IoT device used in the home. FIG. 11 shows an example in which an IoT device used in the home generates a DNS name using object_identifier and location information. FIG. 11 shows rooms (living room, kitchen, bedroom, etc.) in the home, which are denoted by the alphabet (A, B, C, D, E, and F), respectively. The DNS names of the IoT devices in each room are shown in Table 7 below.

TABLE 7

| Area | IoT Device | DNS Nave |
| --- | --- | --- |
| A | Air conditioner | air_conditioner1.object_identifier2.bed_room1.home |

TABLE 7-continued

| Area | IoT Device | DNS Nave |
|---|---|---|
| B | Smart TV | smart_tv1.object_identifier1.living_room.home |
| C | Air conditioner | air_conditioner2.object_identifier3.bed_room2.home |
| D | Air conditioner | air_conditioner3.object_identifier4.bed_room3.home |
| E | Refrigerator | refrigerator1.object_identifier5.kitchen.home |
| F | Washer | washer1.object_identifier6.laundry_room.home |

The DNS names of the air conditioners in the bedroom denoted by A, C, and D each include a unique identifier, object_identifier, location information, and domain suffix (home). The air conditioners in the bedrooms denoted by A, C and D have the same model name. Accordingly, the unique identifiers are air_conditioner1, air_conditioner2, and air_conditioner3, respectively, which are different from each other. Also, the location information of air conditioners is bed_room1, bed_room2 and bed_room3, respectively. When the IoT device is used in a relatively small area as shown in FIG. 7, it may be possible to distinguish the IoT devices from each other only by using the location information without using the unique identifier.

The DNS name of the smart TV in the area denoted by B includes a unique identifier (smart_tv1), object_identifier, location information (living_room), and a domain suffix (home). The DNS name of the refrigerator in the area denoted by E includes a unique identifier (refrigerator1), an object_identifier, location information (living room), and a domain suffix (home). The DNS name of the washing machine in the area denoted by F includes a unique identifier (washer1), an object_identifier, location information (laundry_room) and a domain suffix (home).

A user may check the status of the IoT device, and may control each IoT device. In FIG. 11, a user may access the IoT device disposed in the home through the Internet using an AP in the home. Alternatively, a user may directly access an IoT device through local area network via an AP in the home.

It should be noted that the embodiments and the accompanying drawings merely clarify only a part of the technical spirit included in the above-described technology, and it is obvious that variations and specific embodiments readily deduced by those skilled in the art within the technical spirit included in the specification and drawings are all included in the scope of the right of the above-described technology.

The invention claimed is:

1. A method for naming a Domain Name System (DNS) for an Internet of Things (IoT) device, the method comprising:
    receiving, by a device connected to a network according to an Internet Protocol Version 6 (IPv6) protocol, a first message including a DNS search list including a DNS domain suffix;
    generating, by the device, a domain name including model information of the device and an identifier;
    performing, by the device, a duplicate check on the domain name according to a Neighbor Discovery (ND) protocol;
    generating, by the device, a new domain name including a new identifier that is changed from the identifier when the domain name is duplicated; and
    registering, by a domain name collecting device connected to the network, the domain name and an IPv6 address for the device in a DNS server according to a Node Information (NI) protocol when the domain name is not duplicated,
    wherein the identifier includes a word identifying a kind of the device and at least one character, and
    wherein the at least one character is unique among corresponding characters of identifiers of other devices of a same model that exist in a same domain suffix.

2. The method of claim 1, wherein the receiving of the first message comprises receiving, by the device, the first message through a Router Advertisement (RA) option or a Dynamic Host Configuration Protocol (DHCP) option according to an IPv6 standard.

3. The method of claim 2, wherein the domain name collecting device or a router connected to the network transmits the first message to the device according to the RA option or the DHCP option.

4. The method of claim 1, wherein the domain name further includes any one or any combination of any two or more of an object identifier, a model name, a model category indicating a type of the device, and a network domain of the device.

5. The method of claim 1, wherein the model information includes any one or any combination of any two or more of a model name of the device, a producer or a seller of the device, and a model category indicating a type of the device.

6. The method of claim 1, wherein the domain name includes any one or any combination of any two or more of an object identifier, a model name, a model category indicating a type of the device, and the DNS domain suffix.

7. The method of claim 1, further comprising performing a duplicate check on the new domain name.

8. The method of claim 1, wherein the domain name further includes location information for the device.

9. The method of claim 8, wherein the location information includes geographical coordinate information of a location where the device is located.

10. The method of claim 8, wherein the location information includes relative location information with respect to another device.

11. The method of claim 8, wherein the location information includes relative location information measured using a sensor device measuring a location moving at a reference point.

12. The method of claim 11, wherein the device receives the relative location information measured from the sensor device.

13. The method of claim 8, wherein the location information is inputted into the device through a user terminal connected to the network.

14. The method of claim 1, wherein the registering of the domain name comprises:
    transmitting, by the domain name collecting device, an NI query to the device;

transmitting, by the device, the domain name to the domain name collecting device; and transmitting, by the domain name collecting device, the received domain name to the DNS server.

15. The method of claim 1, further comprising obtaining, by a client device connected to the network, the domain name for the device from the DNS server and monitoring or controlling the device using the domain name.

16. The method of claim 1, wherein the device generates another domain name having a new domain suffix when moving into an area corresponding to the new domain suffix.

17. The method of claim 16, wherein
the moving into the area comprises the device moving from a first room to a second room, and
the second room is the area.

18. The method of claim 1, wherein
an NI query is delivered in multicast to the device and to other devices in a same domain name, and
each of the device and the other devices in the same domain name transmit an NI reply at a randomly delayed time.

19. A method for naming a Domain Name System (DNS) for an Internet of Things (IoT) device, the method comprising:

transmitting, by a router connected to a network according to an Internet Protocol Version 6 (IPv6) protocol, a DNS search list including a DNS domain suffix to the IoT device through a Router Advertisement (RA) option or a Dynamic Host Configuration Protocol (DHCP) option;

generating, by the IoT device, a domain name including model information of the IoT device and an identifier;

generating, by the IoT device, a new domain name including a new identifier that is changed from the identifier when the domain name is duplicated; and registering, by a domain name collecting device managing the IoT device, the domain name and an IPv6 address for the IoT device into a DNS server according to a Node Information (NI) protocol when the domain name is not duplicated, wherein the identifier includes a word identifying a kind of the IoT device and at least one character, and wherein the at least one character is unique among corresponding characters of identifiers of other devices of a same model that exist in a same domain suffix.

20. The method of claim 19, wherein the model information includes any one or any combination of any two or more of a model name of the IoT device, a producer or seller of the IoT device, and a model category indicating a type of the IoT device.

21. The method of claim 19, wherein the domain name further includes location information for the IoT device.

22. The method of claim 19, wherein the IoT device generates another domain name having a new domain suffix when moving into an area corresponding to the new domain suffix.

* * * * *